(12) United States Patent
Shinde et al.

(10) Patent No.: US 9,419,927 B2
(45) Date of Patent: *Aug. 16, 2016

(54) METHOD AND SYSTEM FOR HANDLING UNWANTED EMAIL MESSAGES

(71) Applicant: McAfee Inc., Santa Clara, CA (US)

(72) Inventors: Rajesh Shinde, Hyderabad (IN); Harish Mohan Awasthi, Lucknow (IN)

(73) Assignee: McAfee, Inc., Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/010,527

(22) Filed: Aug. 27, 2013

(65) Prior Publication Data

US 2013/0346528 A1 Dec. 26, 2013

Related U.S. Application Data

(63) Continuation of application No. 11/598,728, filed on Nov. 14, 2006, now Pat. No. 8,577,968.

(51) Int. Cl.
*G06F 15/16* (2006.01)
*H04L 12/58* (2006.01)
*G06Q 10/10* (2012.01)

(52) U.S. Cl.
CPC ............ *H04L 51/12* (2013.01); *G06Q 10/107* (2013.01); *H04L 12/585* (2013.01)

(58) Field of Classification Search
CPC ....... H04L 51/12; H04L 12/585; H04L 12/58; G06Q 10/107
USPC .................................................. 709/204–207
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,779,021 B1 | 8/2004 | Bates et al. | |
| 6,931,433 B1 * | 8/2005 | Ralston et al. | 709/206 |
| 7,194,515 B2 | 3/2007 | Kirsch | |
| 7,281,269 B1 * | 10/2007 | Sievers et al. | 726/24 |

(Continued)

OTHER PUBLICATIONS

Jayashree Ravi, et al., "Personalized Email Management at Network Edges," Wayne State University, Mar.-Apr. 2005, IEEE Internet Computing, Published by the IEEE Computer Society, copyright 2005 IEEE (7 pages).

(Continued)

*Primary Examiner* — Razu A Miah
(74) *Attorney, Agent, or Firm* — Patent Capital Group

(57) ABSTRACT

A method, system, and computer program product for scanning incoming emails reduces the server resources needed, which improves server throughput and reduces costs. A method for processing incoming email messages comprised the steps of scanning incoming email messages to obtain an address of a sender of each incoming email message and to determine whether the email message is spam, for each email message that is determined to be spam, incrementing a count of email messages that are spam for a sender of the email message, determining that a count of email messages that are spam for a sender of an email message has exceeded a threshold, and thereafter, discarding all incoming email messages from the sender for which the count of email messages that are spam for a sender of an email message has exceeded a threshold without scanning the email messages to determine whether they are spam.

24 Claims, 4 Drawing Sheets

(56) References Cited

U.S. PATENT DOCUMENTS

| | | | |
|---|---|---|---|
| 7,299,361 B1 | 11/2007 | Kim et al. | |
| 7,366,761 B2* | 4/2008 | Murray et al. | 709/206 |
| 7,475,118 B2 | 1/2009 | Leiba et al. | |
| 7,500,265 B2 | 3/2009 | Encinas et al. | |
| 7,506,155 B1 | 3/2009 | Stewart et al. | |
| 7,603,422 B2* | 10/2009 | Murphy et al. | 709/206 |
| 7,606,214 B1 | 10/2009 | Chandra Sekhar et al. | |
| 7,617,285 B1 | 11/2009 | Hartmann | |
| 7,636,716 B1* | 12/2009 | Cheng | |
| 7,689,652 B2 | 3/2010 | Mishra et al. | |
| 7,774,413 B2* | 8/2010 | Costea et al. | 709/206 |
| 7,865,561 B2 | 1/2011 | Kelly et al. | |
| 7,882,187 B2* | 2/2011 | Gammage et al. | 709/206 |
| 7,930,351 B2 | 4/2011 | Daniell et al. | |
| 8,577,968 B2 | 11/2013 | Shinde et al. | |
| 2002/0010757 A1 | 1/2002 | Granik et al. | |
| 2002/0038347 A1 | 3/2002 | Maeda | |
| 2002/0059454 A1 | 5/2002 | Barrett et al. | |
| 2002/0116641 A1 | 8/2002 | Mastrianni | |
| 2002/0147780 A1 | 10/2002 | Liu et al. | |
| 2003/0023728 A1 | 1/2003 | Yaung | |
| 2003/0191969 A1* | 10/2003 | Katsikas | 713/201 |
| 2003/0195937 A1 | 10/2003 | Kircher et al. | |
| 2004/0172429 A1* | 9/2004 | Goguen | H04L 12/58 |
| 2004/0177271 A1* | 9/2004 | Arnold et al. | 713/201 |
| 2004/0181581 A1* | 9/2004 | Kosco | G06Q 10/107 709/206 |
| 2004/0210640 A1* | 10/2004 | Chadwick et al. | 709/207 |
| 2004/0258044 A1 | 12/2004 | Girouard et al. | |
| 2005/0015455 A1* | 1/2005 | Liu | G06Q 10/107 709/207 |
| 2005/0021649 A1 | 1/2005 | Goodman et al. | |
| 2005/0022008 A1 | 1/2005 | Goodman et al. | |
| 2005/0044153 A1 | 2/2005 | Gross | |
| 2005/0044155 A1* | 2/2005 | Kaminski | H04L 12/585 709/206 |
| 2005/0064850 A1* | 3/2005 | Irlam et al. | 455/414.1 |
| 2005/0076084 A1* | 4/2005 | Loughmiller et al. | 709/206 |
| 2005/0080855 A1* | 4/2005 | Murray | H04L 12/58 709/206 |
| 2005/0080856 A1* | 4/2005 | Kirsch | H04L 12/58 709/206 |
| 2005/0080857 A1* | 4/2005 | Kirsch | H04L 12/58 709/206 |
| 2005/0080860 A1 | 4/2005 | Daniell et al. | |
| 2005/0091319 A1* | 4/2005 | Kirsch | H04L 12/58 709/206 |
| 2005/0091321 A1 | 4/2005 | Daniell et al. | |
| 2005/0108340 A1 | 5/2005 | Gleeson et al. | |
| 2005/0114452 A1 | 5/2005 | Prakash | |
| 2005/0188045 A1* | 8/2005 | Katsikas | G06Q 10/107 709/206 |
| 2005/0204005 A1* | 9/2005 | Purcell et al. | 709/206 |
| 2005/0210116 A1 | 9/2005 | Samson | |
| 2005/0262209 A1 | 11/2005 | Yu | |
| 2006/0047760 A1 | 3/2006 | Encinas et al. | |
| 2006/0075052 A1* | 4/2006 | Oostendorp | 709/206 |
| 2006/0117387 A1* | 6/2006 | Gunsalus et al. | 726/24 |
| 2006/0168024 A1* | 7/2006 | Mehr et al. | 709/206 |
| 2006/0168041 A1 | 7/2006 | Mishra et al. | |
| 2006/0168046 A1* | 7/2006 | Qureshi | G06Q 10/107 709/206 |
| 2006/0184632 A1* | 8/2006 | Marino et al. | 709/206 |
| 2006/0218232 A1* | 9/2006 | Kubala | G06Q 10/107 709/206 |
| 2006/0277264 A1 | 12/2006 | Rainisto | |
| 2006/0288076 A1* | 12/2006 | Cowings et al. | 709/206 |
| 2007/0039051 A1 | 2/2007 | Duthie et al. | |
| 2007/0088789 A1 | 4/2007 | Berman | |
| 2007/0185960 A1 | 8/2007 | Leiba et al. | |
| 2008/0114843 A1* | 5/2008 | Shinde et al. | 709/206 |
| 2008/0250114 A1* | 10/2008 | Dubovsky et al. | 709/206 |
| 2008/0301235 A1* | 12/2008 | Mankiewicz | 709/206 |
| 2008/0307046 A1* | 12/2008 | Baek et al. | 709/203 |
| 2009/0094342 A1 | 4/2009 | Leiba et al. | |
| 2009/0106367 A1* | 4/2009 | Banerjee et al. | 709/206 |
| 2010/0005146 A1* | 1/2010 | Drako et al. | 709/206 |

OTHER PUBLICATIONS

Mingjun Lan, et al., "Spam Filtering Based on Preference Ranking," School of Information Technology, Deakin University, Proceedings of the 2005 The Fifth International Conference on Computer and Information Technology, copyright 2005 IEEE (5 pages).

USPTO May 28, 2009 Nonfinal Office Action from U.S. Appl. No. 11/598,728.

USPTO Dec. 9, 2009 Final Office Action from U.S. Appl. No. 11/598,728.

USPTO Mar. 25, 2010 Nonfinal Office Action from U.S. Appl. No. 11/598,728.

USPTO Sep. 17, 2010 Nonfinal Office Action from U.S. Appl. No. 11/598,728.

USPTO May 16, 2011 Final Office Action from U.S. Appl. No. 11/598,728.

USPTO Sep. 16, 2011 Nonfinal Office Action from U.S. Appl. No. 11/598,728.

USPTO Jan. 23, 2012 Final Office Action from U.S. Appl. No. 11/598,728.

USPTO Jul. 11, 2013 Notice of Allowance from U.S. Appl. No. 11/598,728.

* cited by examiner

Fig. 3

SECURITY DATABASE

| 302<br>Email Addresses | 304<br>Marked<br>*SPAM* | 306<br>Quarantined | 308<br>Clean<br>Emails |
|---|---|---|---|
| boston@macho.com | 0 | 08 | 00 |
| pretty@meetme.com | 10 | 05 | 00 |
| nitu@gsdqa.com | 00 | 00 | 10 |
| payal@cmc.com | 00 | 00 | 08 |
| Natasha4u@hotgirls.com | 08 | 08 | 00 |
| preetu@mailurcv.com | 05 | 00 | 00 |
| Robert@estates.com | 01 | 01 | 00 |
| nBiz_4u@moneyflows.com | 04 | 03 | 00 |
| Rajesh@gsdqa.com | 00 | 00 | 06 |
|  |  |  |  |

210

METHOD AND SYSTEM FOR HANDLING UNWANTED EMAIL MESSAGES

CROSS REFERENCE TO RELATED APPLICATIONS

This Application is a continuation (and claims the benefit of priority under 35 U.S.C. §120) of U.S. application Ser. No. 11/598,728, filed Nov. 14, 2006, now issued as U.S. Patent No. 8,577,968, and entitled METHOD AND SYSTEM FOR HANDLING UNWANTED EMAIL MESSAGES. The disclosure of the prior Application is considered part of and is incorporated by reference in its entirety in the disclosure of this Application.

BACKGROUND OF THE INVENTION

1. Field of the Invention

The present invention relates to handling unwanted email messages by automatically compiling a list of senders of email messages that are to be discarded without scanning.

2. Description of the Related Art

Malicious codes in the form of trojans, worms, adware, spyware, and rootkits have multiplied and grown enormously throughout the last two decades. In the computer and internet technology world there are estimated to be 180,000 viruses in existence, with new ones hitting computers every day. The response to these problems has created an industry of Anti-virus and Anti-spyware products. Although malware, such as viruses, trojans and worms are quite prevalent, the most widespread form of malware is unsolicited commercial email, commonly known as spam. The use of spam has grown rapidly and still growing. The corporate world and individual home users are spending millions of dollars to combat spam. Internet Service Providers (ISPs) have to cope with greatly increasing day to day amounts of network traffic due to the increase in spam emails. If spam traffic continues to grow, it may become unmanageable in the near future.

Typically, spam has been fought by the use of software that scans all incoming email messages to determine whether each message is spam. If so, the messages are accordingly marked as *SPAM* or quarantined. These actions are taken on each email message that arrives at an email server that is protected by the anti-spam software. Each email message is categorized depending upon the rules that it triggers. These rules can be a mixture of BAYSEAN filtering, honeypot addresses and mail rules, Header and Heuristic analysis, Text Analysis, URL classifications etc. These rules are updated on monthly, weekly or even daily basis depending upon the spam samples collected through researching the entire web. Typically, Anti-Spam products also have options to White-list and Blacklist email addresses. The Emails that arrive from the White-listed email addresses are sent directly to the User's inbox, while the emails that arrive from Blacklist emails addresses are scanned and sent to a quarantine database or discarded.

However, a large ISP can receive millions of emails each day, each of which must be scanned. Other large organizations may receive thousand of emails each day. On an average each mail takes from 15 milliseconds to 400 milliseconds to scan for such spam content. Thus consumes a huge amount of email server time and can in turn create a loss in the productivity of the organization. A need arises for a technique by which the server resources needed to scan incoming emails can be reduced, which will improve server throughput and reduce costs.

SUMMARY OF THE INVENTION

A method, system, and computer program product for scanning incoming emails reduces the server resources needed, which improves server throughput and reduces costs.

A method for processing incoming email messages comprised the steps of scanning incoming email messages to obtain an address of a sender of each incoming email message and to determine whether the email message is spam, for each email message that is determined to be spam, incrementing a count of email messages that are spam for a sender of the email message, determining that a count of email messages that are spam for a sender of an email message has exceeded a threshold, and thereafter, discarding all incoming email messages from the sender for which the count of email messages that are spam for a sender of an email message has exceeded a threshold without scanning the email messages to determine whether they are spam.

The method may further comprise the step of in response to determining that a count of email messages that are spam for a sender of an email message has exceeded a threshold, placing an email address of the sender in a spam list. The discarding step may comprise the steps of comparing an email address of a sender of an incoming email message with email addresses in the spam list, and discarding the email message if the email address of the sender of the incoming email message is found in the spam list. The incrementing step may be performed for a period of time. Email addresses may be added to the spam list at an end of the period of time.

The method may further comprise the steps of determining that a count of email messages that are clean for a sender of an email message has exceeded a threshold, and thereafter, sending to recipient inboxes all incoming email messages from the sender for which the count of email messages that are clean for a sender of an email message has exceeded a threshold without scanning the email messages to determine whether they are spam. The method of claim 6, may further comprise the step of in response to determining that a count of email messages that are clean for a sender of an email message has exceeded a threshold, placing an email address of the sender in a clean list. The sending step may comprise the steps of comparing an email address of a sender of an incoming email message with email addresses in the clean list, and sending the email message to a recipient inbox if the email address of the sender of the incoming email message is found in the clean list. The incrementing step may be performed for a period of time. Email addresses may be added to the clean list at an end of the period of time.

The method may further comprise the steps of in response to determining that a count of email messages that are spam for a sender of an email message has exceeded a threshold, placing an email address of the sender in a spam list, and in response to determining that a count of email messages that are clean for a sender of an email message has exceeded a threshold, placing an email address of the sender in a clean list. The discarding step may comprise the steps of comparing an email address of a sender of an incoming email message with email addresses in the spam list, and discarding the email message if the email address of the sender of the incoming email message is found in the spam list, and the sending step may comprise the steps of comparing an email address of a sender of an incoming email message with email addresses in the clean list, and sending the email message to a recipient inbox if the email address of the sender of the incoming email message is found in the clean list. The incrementing steps may be performed for a period of time. Email addresses may be added to the spam list and the clean list at an end of the period of time.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary format of a security database shown in FIG. 2.

DETAILED DESCRIPTION OF THE INVENTION

A method, system, and computer program product for scanning incoming emails reduces the server resources needed, which improves server throughput and reduces costs.

Figure 1:
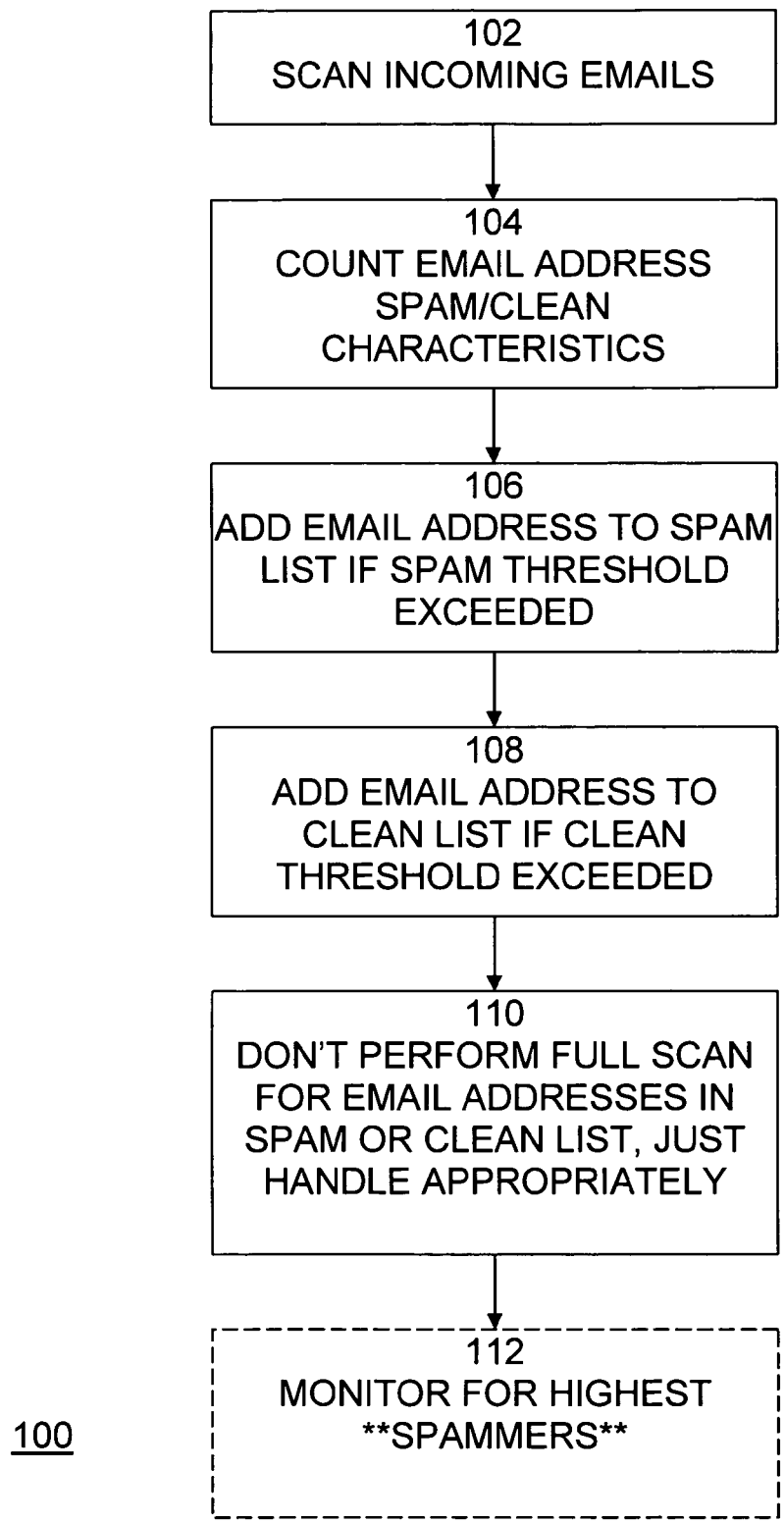
FIG. 1 is an exemplary flow diagram of a process for scanning incoming emails.
Figure 2:
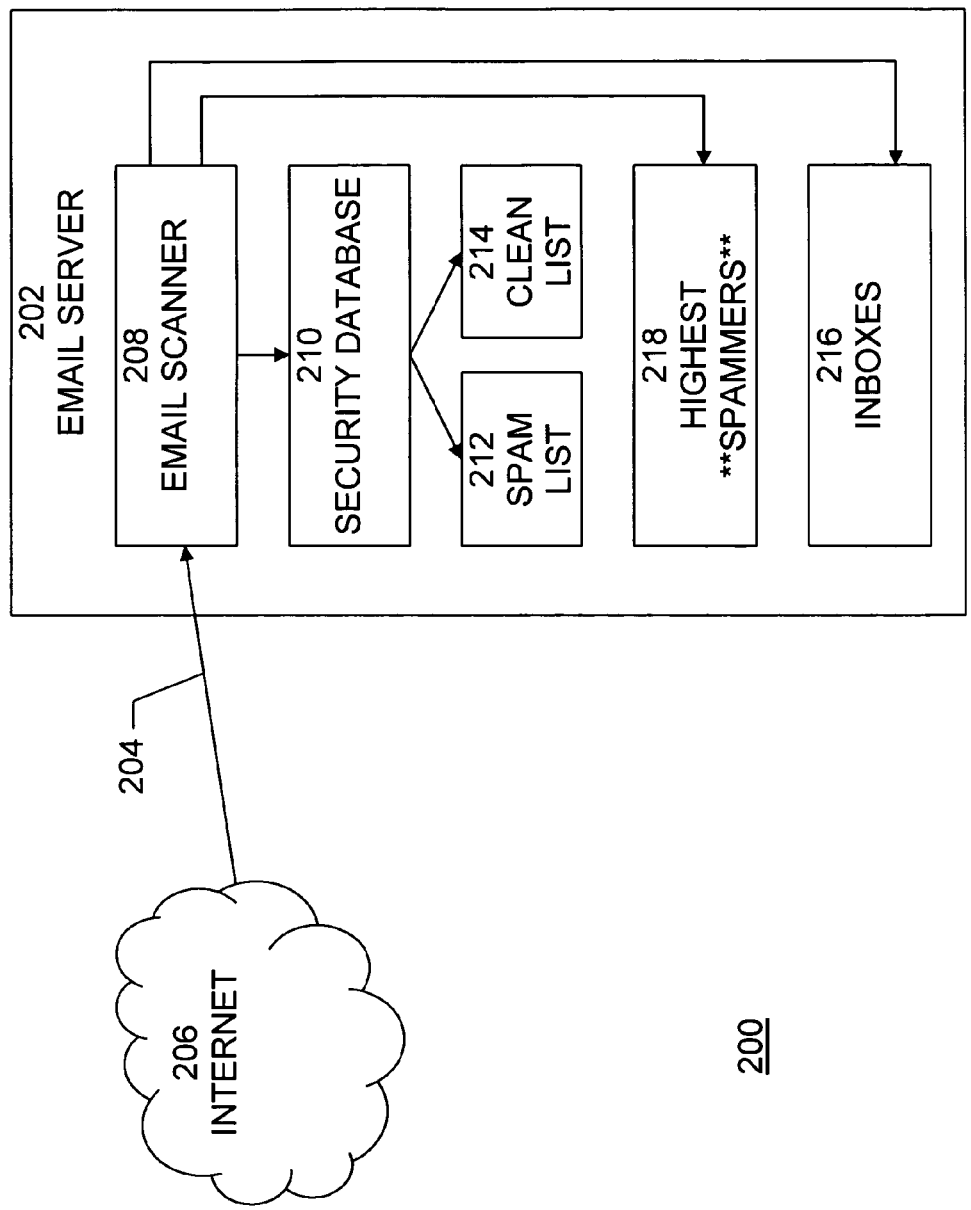
FIG. 2 is an exemplary block diagram of a system in which the present invention may be implemented.

A method, system, and computer program product for scanning incoming emails reduces the server resources needed, which improves server throughput and reduces costs. An example of such a process 100 is shown in FIG. 1. It is best viewed in conjunction with FIG. 2, which is a block diagram of a system 200 in which the present invention may be implemented. As shown in the example of FIG. 2, email server 202 receives email messages 204 via the Internet 206, or other unsecure network. The email messages are processed by email scanner 208 using process 100. Process 100 begins with step 102, in which email scanner 208 scans the incoming email messages 204. Email scanner 208 automates the highlighting, removal or filtering of e-mail spam by scanning through incoming and outgoing e-mails in search of traits typical of spam. Such scanning may include searching for patterns in the headers or bodies of messages. Each incoming email message is scanned to determine whether it is a spam email message that is to be marked as *SPAM*, a dangerous spam email message that is to be quarantined, or a clean email message that is to be delivered as is to the recipient's inbox. In addition, email scanner 208 scans the email address of the sender of the email, and may also scan the first and last name of the sender of the email.

In step 104, email scanner 208 counts the spam/clean characteristics of the scanned email messages 204 and stores the resulting counts in a security database 210. An example of security database 210 is shown in FIG. 3. Security database 210 includes an email addresses column 302, a count of email messages marked *SPAM* column 304, a count of email messages quarantined column 306, and a count of clean email messages column 308. For each email message received, security database 210 is accessed using the email address of the sender of the message. The row in the database 210 that includes an email address that matches the email address of the sender of the message is accessed and the counts in columns 304, 306, and 308 are incremented based on the results of the scanning of that message. In particular, if email scanner 208 determines that an email message is to be marked as *SPAM*, the count in the marked as *SPAM* column 304 is incremented. If email scanner 208 determines that an email message is to be quarantined, the count in the quarantined column 306 is incremented. If email scanner 208 determines that an email message is a clean email message, the count in the clean email column 308 is incremented. If the email address of the sender of an incoming email message is not found in security database 210, a new row including the email address of the sender of the incoming email message is added to security database 210, and the counts in columns 304, 306, and 308 of the new row are incremented accordingly.

In step 106, when any count value in the marked as *SPAM* column 304 or the quarantined column 306 exceeds a threshold, the email address of the row in which that count is present is placed on a spam list 212. Likewise, in step 108, when any count value in the clean emails column 308 exceeds a threshold, the email address of the row in which that count is present is placed on a clean list 214. Then, in step 110, email scanner 208 no longer performs a full scan of email messages that are received that have sender email addresses that are in either the spam list 212 or the clean list 214. Rather, the email message is handled appropriately without a full scan. Email scanner 208 still scans all incoming email messages 204 to obtain the email address of the sender of each message. Email scanner 208 then checks the spam list 212 and the clean list 214 to determine whether that email address is present in either list. If the email address of the sender of the message is present in the spam list 212, the message is simply discarded. If the email address of the sender of the message is present in the clean list 214, the message is delivered to the inbox 216 of the recipient without a full scan being performed.

Typically, the counts are compiled for a predefined period, such as 24 hours. Those sender email addresses that have exceeded either the spam or the clean thresholds within this period have been placed on either the spam list 212 or the clean list 214. For all other email addresses, at the end of each period, the counts may be reset, or the entry or entries in security database 210 may be deleted. The counts may be compiled with the same period for all entries in security database 210. For example, all counts in security database 210 may be reset every day at the same time, or all entries in security database 210 may be deleted every day at the same time. Alternatively, the counts may be compiled with different periods or with periods of different lengths for each entry in security database 210. For example, the counts for each entry may be reset 24 hours after the last reset of that entry, or the entry may be deleted 24 hours after the creation of that entry. In this way, full scanning of email messages from spam email addresses and from clean email addresses can be avoided, reducing the processing load on email scanner 208, and thus the processing load on email server 202.

Likewise, the spam list 212 and/or the clean list 214 may be periodically deleted or updated, either with a period similar to that used for compiling the counts, or with a period greater than that used for compiling the counts. This allows the spam list 212 and/or the clean list 214 to be dynamically updated, to capture changes in behavior of various sender email addresses.

The period for compiling the counts, as well as the spam and clean thresholds are typically determined by an administrator of email server 202, but may also be determined by a vendor of the email processing software, or by a user of the system.

Finally, in optional step 112, email addresses included in spam list 212 may be monitored for a greater period of time to find that email addresses that send the greatest amounts of spam. These email addresses may be listed on a Highest SPAMMERS list 218, which may be maintained permanently and/or replicated to other email servers to have a common settings and cut down the scanning time for such unwanted emails by email servers.

Administration of the email system may be improved by implementing Security Auditing for the email system Administrator. For example, an ALERT email message may be sent to the Administrator containing information about the new email addresses added to the Security Database. Subsequently, additional ALERT email messages may be sent about email addresses added to the spam list, the clean list, and the Highest SPAMMERS list during a specified time configured by the Administrator. For example, after every 24 hours, ALERT email messages may be sent to the Administrator, which include the list of new email addresses added to the spam list, the clean list, and the Highest SPAMMERS list.

Figure 4:
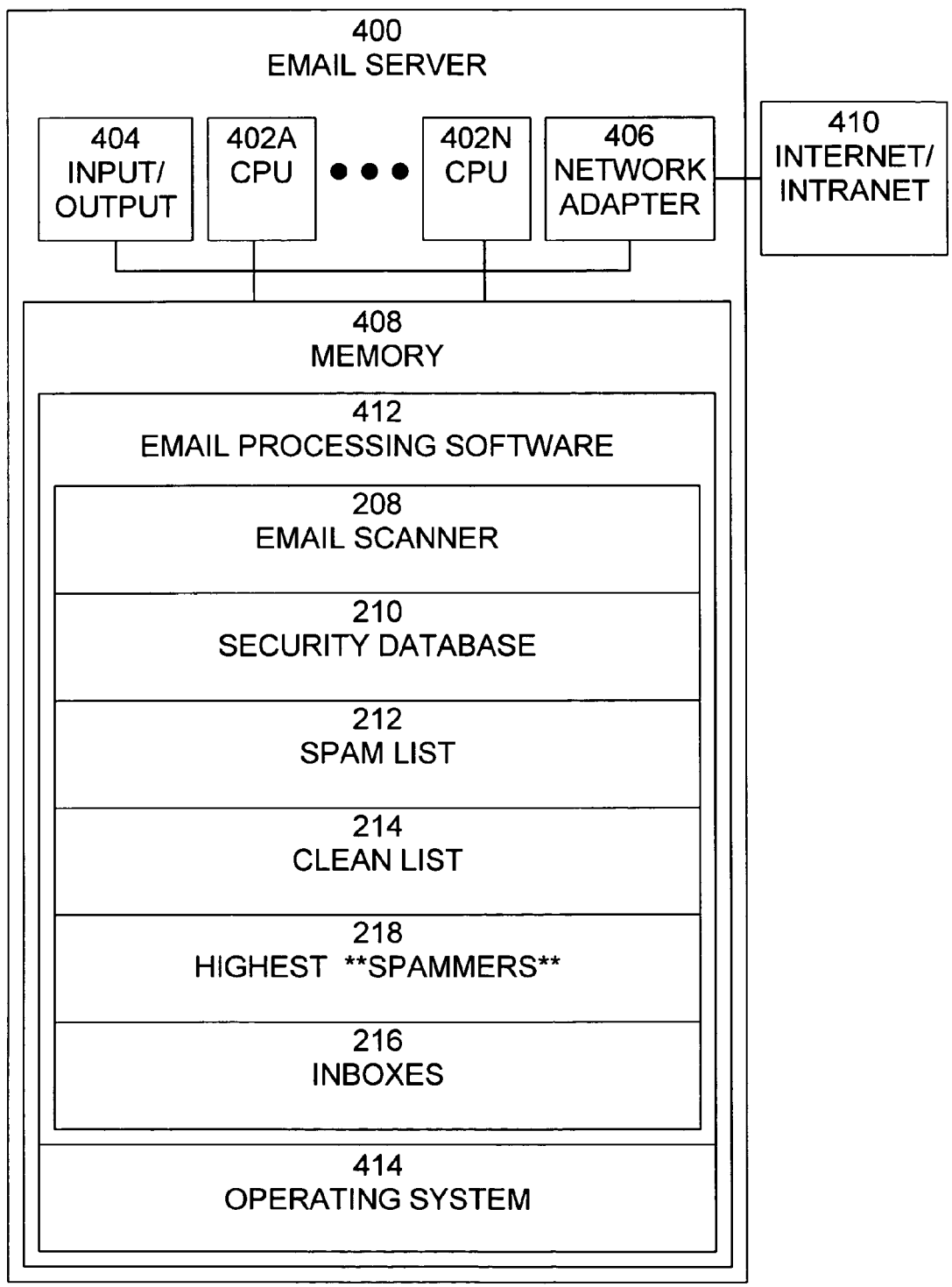
FIG. 4 is an exemplary block diagram of an email server, in which the present invention may be implemented.

An exemplary block diagram of a email server 400, in which the present invention may be implemented, is shown in FIG. 4. Email server 400 is typically a programmed general-purpose computer system, such as a personal computer, workstation, server system, and minicomputer or mainframe computer. Email server 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which email server 400 is implemented as a single multi-processor computer system, in which multiple processors 402A-402N share system resources, such as memory 408, input/output circuitry 404, and network adapter 406. However, the present invention also contemplates embodiments in which email server 400 is implemented as a plurality of networked computer systems, which may be single-processor computer systems, multi-processor computer systems, or a mix thereof.

Input/output circuitry 404 provides the capability to input data to, or output data from, email server 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces email server 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPUs 402A-N to perform the functions of email server 400. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc., or a fiber channel-arbitrated loop (FC-AL) interface.

In the example shown in FIG. 4, memory 408 includes email processing software 412 and operating system 414. Email processing software 412 includes email scanner 208, security database 210, spam list 212, clean list 214, highest *SPAMMERS* list 218, and recipient inboxes 216, as well as additional functionality that is not shown. Email scanner 208 automates the highlighting, removal or filtering of e-mail spam by scanning through incoming and outgoing e-mails in search of traits typical of spam. Such scanning may include searching for patterns in the headers or bodies of messages. Each incoming email message is scanned to determine whether it is a spam email message that is to be marked as *SPAM*, a dangerous spam email message that is to be quarantined, or a clean email message that is to be delivered as is to the recipient's inbox. In addition, email scanner 208 scans the email address of the sender of the email, and may also scan the first and last name of the sender of the email. Email scanner 208 counts the spam/clean characteristics of the scanned email messages and stores the resulting counts in a security database 210. Spam list 212 and clean list 214 are lists of sender email addresses for which the spam characteristic counts or clean characteristics counts have exceeded a threshold. Spam list 212 and clean list 214 are used to determine whether an incoming email message is to be discarded without a full scan, sent to a recipient inbox without a full scan, or given a full scan. Highest SPAMMERS list 218 is a list of sender email addresses which send the greatest amounts of spam and which may be maintained permanently and/or replicated to other email servers to have a common settings and cut down the scanning time for such unwanted emails by email servers. Inboxes 216 are mail folders into which incoming email messages are placed so that they may be seen and read by recipients of the email messages. Operating system 414 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, comprising:
    scanning, in response to a determination that a first time period has ended, email messages from an email address of a sender previously identified as a source of spam;
    placing the email address of the sender in a clean list such that scanning software is subsequently prevented from performing a full scan of additional messages from the email address of the sender, the placing performed in response to a determination that a count of the email messages that are clean has exceeded a threshold over a second time period, the second time period similar or less than the first time period; and
    placing the email address of the sender in a spammers list in response to a determination that a count of the email messages that are spam has exceeded a threshold over a third time period greater than the second time period, wherein the spammers list is replicated to another server.

2. The method of claim 1, further comprising:
    scanning the email messages to identify patterns in headers of the email messages.

3. The method of claim 1, wherein the scanning further comprises:
    scanning a first name and a last name of the sender.

4. The method of claim 1, further comprising:
    counting spam and clean characteristics of the email messages; and
    storing results of the counting in a security database.

5. The method of claim 4, wherein the security database includes a selected one or more of a group of columns, the group consisting of:
    a) an email address column;
    b) a count of email messages marked spam column;
    c) a count of email messages quarantined column; and
    d) a count of clean email messages column.

6. The method of claim 4, wherein the security database is accessed by an email server using the email address of the sender.

7. The method of claim 5, wherein the columns in the database are incremented based on results associated with scanning the email messages.

8. A method, comprising:
    scanning email messages from an email address of a sender previously identified as a source of spam;
    determining that a count of the email messages that are clean has exceeded a threshold over a predefined time period;
    placing the email address of the sender in a clean list such that scanning software is subsequently prevented from performing a full scan of additional messages from the email address of the sender;
    obtaining respective email addresses for each of a plurality of email messages;
    evaluating a spam list and the clean list of a database to determine whether the respective email addresses are present in either of the lists;
    discarding a first group of the plurality of email messages based on the first group having corresponding email addresses that are present on the spam list; and
    delivering a second group of the plurality of email messages based on the second group having corresponding email addresses that are present on the clean list.

9. One or more non-transitory, computer-readable storage media storing instructions that, when executed, cause a computing device to perform a method, the method comprising:
    scanning, in response to a determination that a first time period has ended, email messages from an email address of a sender previously identified as a source of spam;
    placing the email address of the sender in a clean list such that scanning software is subsequently prevented from performing a full scan of additional messages from the email address of the sender, the placing performed in response to a determination that a count of the email messages that are clean has exceeded a threshold over a second time period, the second time period similar or less than the first time period; and
    placing the email address of the sender in a spammers list in response to a determination that a count of the email messages that are spam has exceeded a threshold over a third time period greater than the second time period, wherein the spammers list is replicated to another server.

10. The one or more computer-readable storage media of claim 9, the method further comprising:
    scanning the email messages to identify patterns in headers of the email messages.

11. The one or more computer-readable storage media of claim 9, the method further comprising:
    scanning a first name and a last name of the sender.

12. The one or more computer-readable storage media of claim 9, the method further comprising:
    counting spam and clean characteristics of the email messages; and
    storing results of the counting in a security database.

13. The one or more computer-readable storage media of claim 12, wherein the security database includes a selected one or more of a group of columns, the group consisting of:
    a) an email address column;
    b) a count of email messages marked spam column;
    c) a count of email messages quarantined column; and
    d) a count of clean email messages column.

14. The one or more computer-readable storage media of claim 12, wherein the security database is accessed by an email server using the email address of the sender.

15. The one or more computer-readable storage media of claim 13, wherein the columns in the security database are incremented based on results associated with scanning the email messages.

16. One or more non-transitory, computer-readable storage media storing instructions that, when executed, cause a computing device to perform a method, the method comprising:
    scanning email messages from an email address of a sender previously identified as a source of spam;
    determining that a count of the email messages that are clean has exceeded a threshold over a predefined time period;
    placing the email address of the sender in a clean list such that scanning software is subsequently prevented from performing a full scan of additional messages from the email address of the sender;

obtaining respective email addresses for each of a plurality of email messages;

evaluating a spam list and the clean list of a database to determine whether the respective email addresses are present in either of the lists;

discarding a first group of the plurality of email messages based on the first group having corresponding email addresses that are present on the spam list; and delivering a second group of the plurality of email messages based on the second group having corresponding email addresses that are present on the clean list.

17. A server, comprising:

a processor; and a memory coupled to the processor, wherein the server is configured to perform a scanning, in response to a determination that a first time period has ended, email messages from an email address of a sender previously identified as a source of spam;

place the email address of the sender in a clean list such that scanning software is subsequently prevented from performing a full scan of additional messages from the email address of the sender, the email address placed in the clean list in response to a determination that a count of the email messages that are clean has exceeded a threshold over a second time period, the second time period similar or less than the first time period; and place the email address of the sender in a spammers list in response to a determination that a count of the email messages that are spam has exceeded a threshold over a third time period greater than the second time period, wherein the spammers list is replicated to another server.

18. The server of claim 17, wherein the server is further configured to scan the email messages to identify patterns in headers of the email messages.

19. The server of claim 17, wherein the scanning further comprises:

scanning a first name and a last name of the sender.

20. The server of claim 17, wherein the server is further configured to perform a counting of spam and clean characteristics of the email messages and to store results of the counting in a security database.

21. The server of claim 20, wherein the security database includes a selected one or more of a group of columns, the group consisting of:

a) an email address column;

b) a count of email messages marked spam column;

c) a count of email messages quarantined column; and d) a count of clean email messages column.

22. The server of claim 20, wherein the security database is accessed by the server using the email address of the sender.

23. The server of claim 21, wherein the columns in the security database are incremented based on results associated with scanning the email messages.

24. A server, comprising:

a processor; and a memory coupled to the processor, wherein the server is configured to scan email messages from an email address of a sender previously identified as a source of spam;

determine that a count of the email messages that are clean has exceeded a threshold over a predefined time period;

place the email address of the sender in a clean list such that scanning software is subsequently prevented from performing a full scan of additional messages from the email address of the sender;

obtain respective email addresses for each of a plurality of email messages;

evaluate a spam list and the clean list of a database to determine whether the respective email addresses are present in either of the lists;

discard a first group of the plurality of email messages based on the first group having corresponding email addresses that are present on the spam list; and deliver a second group of the plurality of email messages based on the second group having corresponding email addresses that are present on the clean list.

* * * * *